(12) United States Patent
Takeoka et al.

(10) Patent No.: US 8,917,162 B2
(45) Date of Patent: Dec. 23, 2014

(54) WIRELESS COMMUNICATION APPARATUS AND ANTENNA DEVICE

(71) Applicant: Murata Manufacturing Co., Ltd., Nagaokakyo-shi, Kyoto-fu (JP)

(72) Inventors: Makoto Takeoka, Nagaokakyo (JP); Noboru Kato, Nagaokakyo (JP); Makoto Yasutake, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/308,896

(22) Filed: Jun. 19, 2014

(65) Prior Publication Data

US 2014/0300453 A1  Oct. 9, 2014

Related U.S. Application Data

(63) Continuation of application No. PCT/JP2013/080453, filed on Nov. 11, 2013.

(30) Foreign Application Priority Data

Nov. 16, 2012  (JP) ................. 2012-252570

(51) Int. Cl.
*H04Q 5/22* (2006.01)
*G06K 7/00* (2006.01)

(52) U.S. Cl.
CPC .................. *G06K 7/0008* (2013.01)
USPC ....................................... 340/10.1

(58) Field of Classification Search
USPC ............ 340/10.1, 572.5, 572.2, 12.51, 13.26; 455/130; 343/702, 850, 853
See application file for complete search history.

(56) References Cited

U.S. PATENT DOCUMENTS

| | | | |
|---|---|---|---|
| 8,543,060 B2* | 9/2013 | Mutikainen et al. | 455/41.2 |
| 8,553,576 B2* | 10/2013 | Park | 370/252 |
| 8,560,012 B2* | 10/2013 | Ohnishi et al. | 455/556.1 |
| 2008/0012712 A1 | 1/2008 | Shimizu | |
| 2010/0084467 A1 | 4/2010 | Nishido | |
| 2010/0103055 A1* | 4/2010 | Waku et al. | 343/702 |

FOREIGN PATENT DOCUMENTS

| | | |
|---|---|---|
| JP | 2008-022435 A | 1/2008 |
| JP | 4069958 B2 | 4/2008 |
| JP | 2010-108485 A | 5/2010 |
| JP | 2012-147408 A | 8/2012 |
| WO | 2008/105477 A1 | 9/2008 |

OTHER PUBLICATIONS

Official Communication issued in International Patent Application No. PCT/JP2013/080453, mailed on Feb. 10, 2014.

* cited by examiner

*Primary Examiner* — Phung Nguyen
(74) *Attorney, Agent, or Firm* — Keating & Bennett, LLP

(57) ABSTRACT

A wireless communication apparatus includes a first communication system, and a second communication system configured to transmit a transmission signal in a communication frequency band which is the same or substantially the same as that of the first communication system and at an electric power which is stronger than that of a reception signal of the first communication system. The first communication system includes a feeder circuit having a resonant frequency, the resonant frequency being within the communication frequency band if a reception signal of the first communication system is input, and the resonant frequency being out of the communication frequency band if a transmission signal of the second communication system is input.

20 Claims, 14 Drawing Sheets

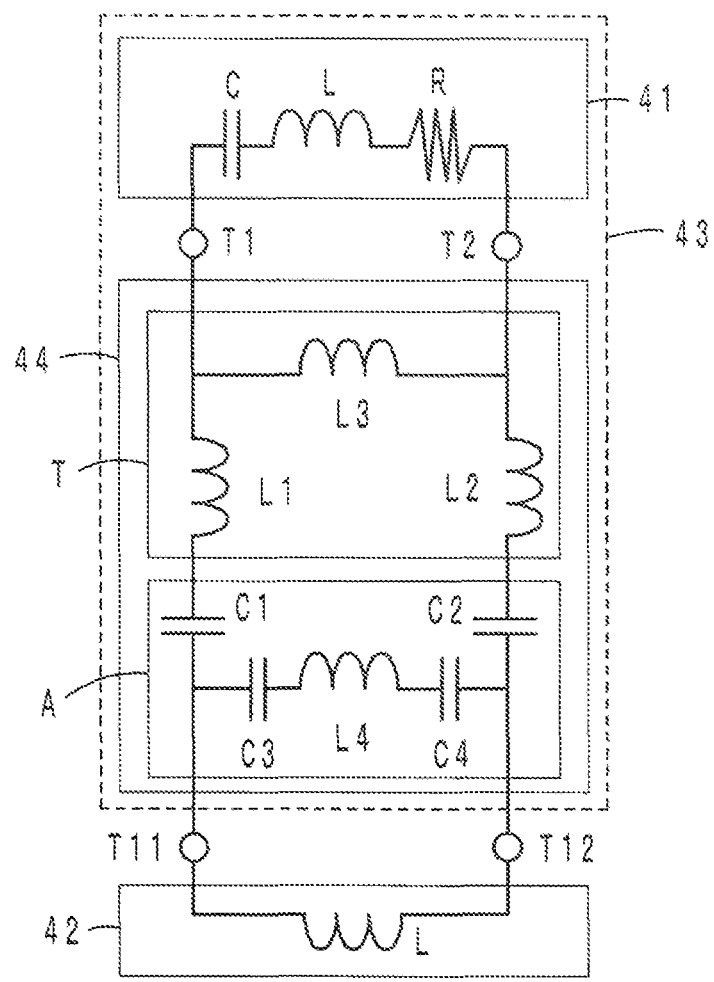
F I G . 5

(A)

(B)

(C)

(D)

(A)

(B)

WIRELESS COMMUNICATION APPARATUS AND ANTENNA DEVICE

This application is based on Japanese Patent Application No. 2012-252570 filed on Nov. 16, 2012 and International Application No. PCT/JP2013/080453 filed on Nov. 11, 2013, the entire contents of each of which is incorporated herein by reference.

BACKGROUND OF THE INVENTION

1. Field of the Invention

The present invention relates to wireless communication apparatuses and more specifically to a wireless communication apparatus including a communication system preferably for use in an RFID (Radio Frequency Identification) system and a communication system such as a cell phone, and relates to an antenna device which is used for an RFID system in the wireless communication apparatus.

2. Description of the Related Art

In recent years, as an information management system for articles, the RFID system has been in practical use which establishes communication between a reader/writer for generating an induced magnetic field and an RFID tag (also referred to as "RFID device") in which predetermined information is stored and which is attached to an article in a non-contact fashion with the use of an electromagnetic field in order to transmit the predetermined information.

As the RFID device, for example, the device disclosed in Japanese Patent No. 4069958 is known. This RFID device includes a wireless IC, a feeder circuit board including a resonance circuit which has a predetermined resonant frequency, and a radiation plate. The frequency of transmission signals and/or reception signals substantially corresponds to the resonant frequency of the resonance circuit. The resonance circuit may also function as a matching circuit for matching the impedance of the wireless IC and the impedance of the radiation plate.

By the way, in recent years, incorporating an RFID communication system into a cellular communication device, such as a cell phone, a smartphone, or the like, has been realized. In this case, when a transmission wave of the cellular system is input to the RFID device, there is a concern that the wireless IC of the RFID system is driven and spurious radiation occurs. Particularly, in the GSM (registered trademark) system, the frequency band used is near to the frequency used in the RFID system, and therefore, the transmission wave is readily input to the wireless IC of the RFID. Furthermore, since the transmission power is large, spurious radiation generated by the RFID device is large.

That is, there is a problem that part of transmission signals of the cellular system, such as the GSM, flows into the RFID device so that the characteristic (communication sensitivity) of the transmission signals deteriorates. Harmonics in the 900 MHz band are used in other systems, such as GSM 1800 and W-LAN, in many cases, and there is another problem that spurious radiation from the RFID device becomes noise and causes adverse effects on those systems.

SUMMARY OF THE INVENTION

Preferred embodiments of the present invention provide a wireless communication apparatus and an antenna device which are capable of significantly reducing or preventing adverse effects of one communication system on transmission signals of another communication system.

A wireless communication apparatus according to a first preferred embodiment of the present invention includes a first communication system; and a second communication system configured to transmit a transmission signal in a communication frequency band which is the same or substantially the same as that of the first communication system and at an electric power which is stronger than that of a reception signal of the first communication system, wherein the first communication system includes a feeder circuit having a resonant frequency, the resonant frequency being within the communication frequency band if a reception signal of the first communication system is input, and the resonant frequency being out of the communication frequency band if a transmission signal of the second communication system is input.

An antenna device according to a second preferred embodiment of the present invention is an antenna device for use in a first communication system of a wireless communication apparatus that includes the first communication system and a second communication system configured to transmit a transmission signal in a communication frequency band which is the same or substantially the same as that of the first communication system and at an electric power which is stronger than that of a reception signal of the first communication system, wherein the antenna device includes a feeder circuit having a resonant frequency, the resonant frequency being within the communication frequency band if a reception signal of the first communication system is input, and the resonant frequency being out of the communication frequency band if a transmission signal of the second communication system is input.

In the wireless communication apparatus, the second communication system is configured to transmit a transmission signal in a communication frequency band which is the same or substantially the same as that of the first communication system and at an electric power which is stronger than that of a reception signal of the first communication system. At this time, in the feeder circuit of the first communication system, the resonant frequency of the feeder circuit shifts to the outside of the communication frequency band of the second communication system. Therefore, the first communication system hardly operates, and deterioration of the characteristics of a transmission signal of the second communication system (decrease of the output signal) is prevented.

According to various preferred embodiments of the present invention, adverse effects of the first communication system on transmission signals of the second communication system are significantly reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is an equivalent circuit diagram showing the first example of a feeder circuit in the RFID system.

DETAILED DESCRIPTION OF THE PREFERRED EMBODIMENTS

Hereinafter, examples of a wireless communication apparatus and an antenna device according to various preferred embodiments of the present invention will be described with reference to the attached drawings. Common elements and parts are referred to using the same reference marks throughout the drawings, and the repetitive description is omitted.

Figure 1:
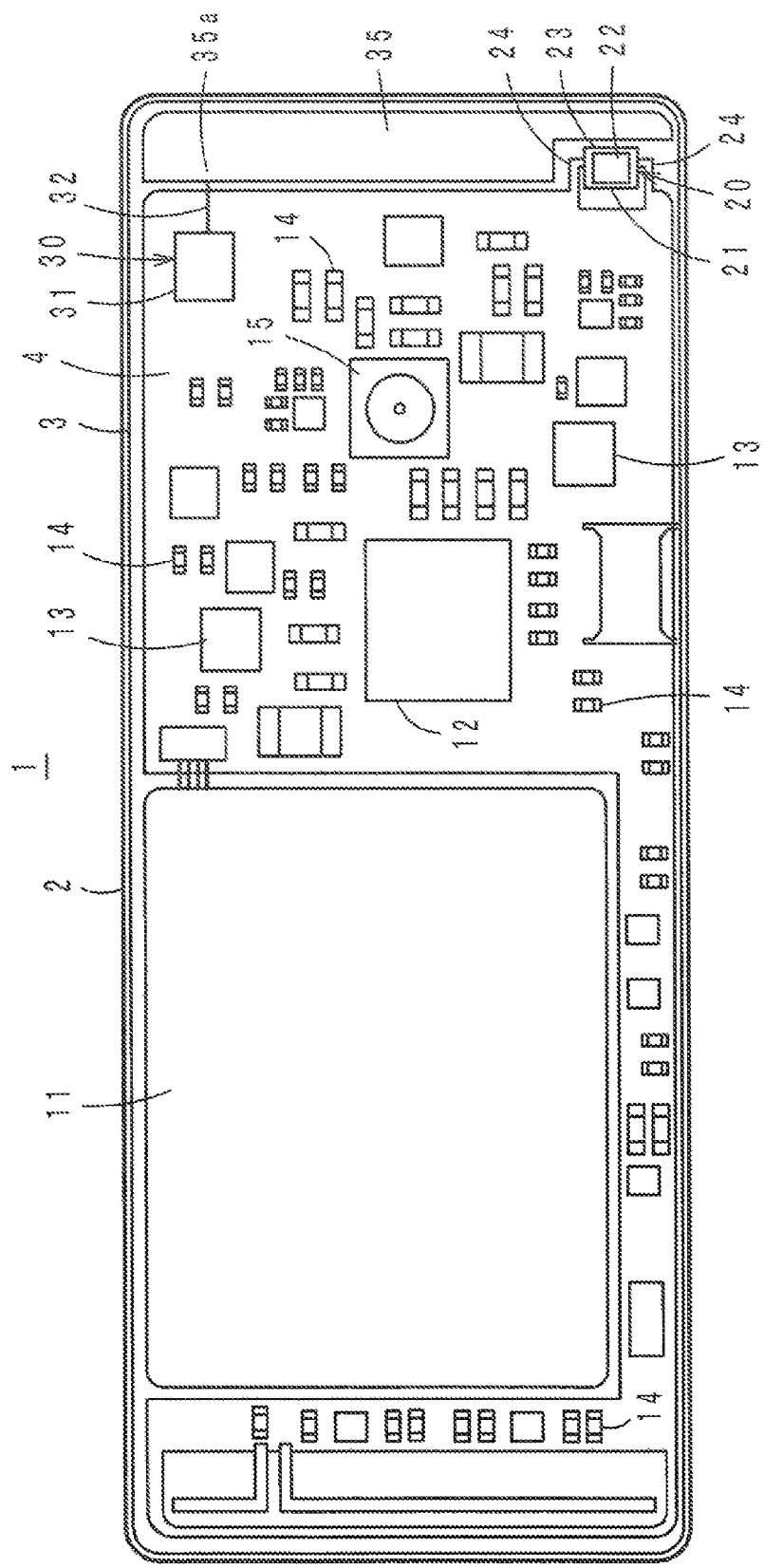
FIG. 1 is a plan view showing an internal configuration of a wireless communication apparatus (cell phone) which is one example of a preferred embodiment of the present invention.

A wireless communication apparatus 1 shown in FIG. 1 preferably is a cell phone, including a cellular (GSM) system 30 which is an example of the second communication system, and further including an RFID system 20 which is an example of the first communication system. On a printed wiring board 3 incorporated in a case 2, a battery 11, a switching module 12, various ICs 13, elements 14 such as chip resistors and chip capacitors, a digital camera 15, etc., are mounted.

The cellular system 30 includes a main antenna 35 provided at one end of the printed wiring board 3 and a wireless IC 31. The main antenna 35 includes a power feeding section 35a which is coupled to an antenna terminal of the wireless IC 31 via a feeding pin 32. The wireless IC 31 includes a ground terminal which is coupled to a ground conductor 4 provided on the printed wiring board 3.

Figure 2:
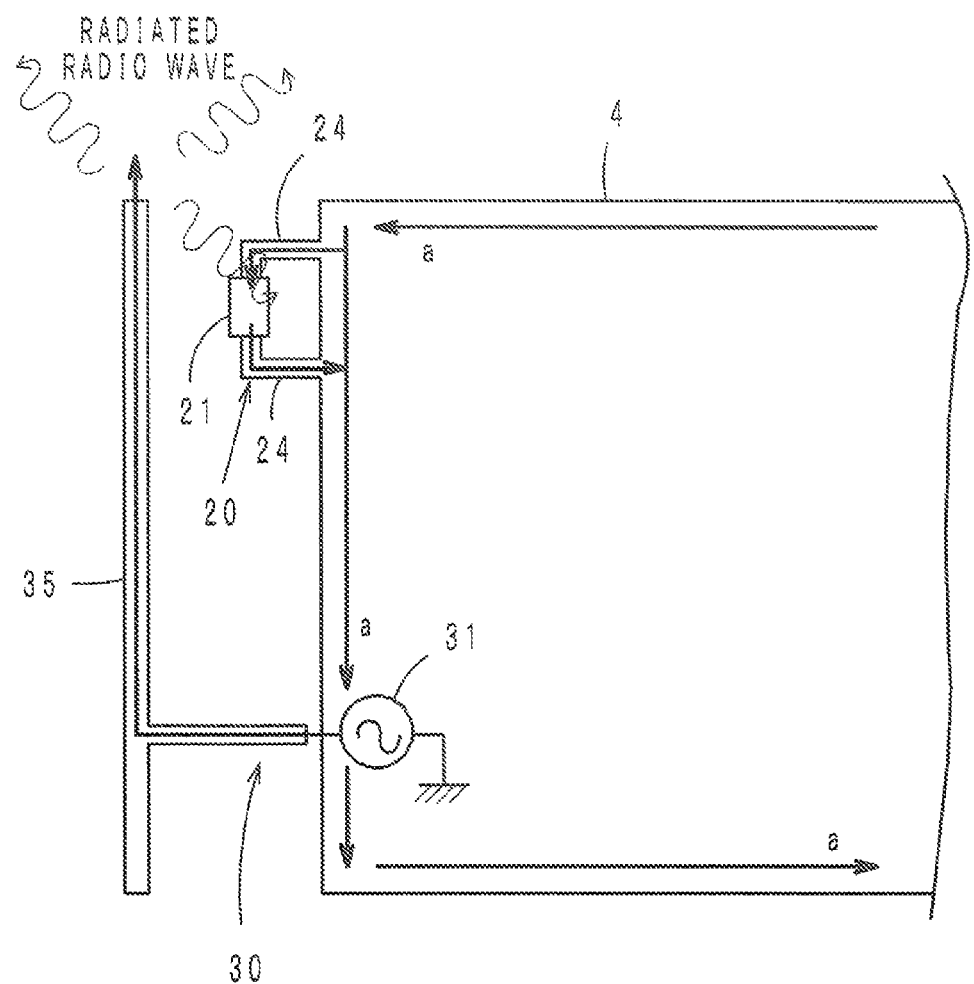
FIG. 2 is an illustration diagram showing an antenna portion of the wireless communication apparatus.

The RFID system 20 is provided at one end of the printed wiring board 3 so as to be closely adjacent to a tip end portion of the main antenna 35, and includes an RFID device 21 (preferably including an RFID wireless IC 22 and a feeder circuit board 23) and a loop-shaped conductor 24. The RFID wireless IC 22 is a semiconductor integrated circuit element configured to process UHF-band RFID signals, which includes a clock circuit, a logic circuit, a memory circuit, etc., and in which necessary information is stored. Specifically, as shown in FIG. 2, the loop-shaped conductor 24 includes a pair of conductors extending from the ground conductor 4 such that end portions are closely adjacent to each other (see also FIG. 16). As will be described below, one end and the other end are coupled to terminals T11, T12 of the feeder circuit 43 (see FIG. 5).

In the RFID system 20, a transmission signal supplied from the wireless IC 22 is guided to the ground conductor 4 via the loop-shaped conductor 24 and is radiated from the ground conductor 4 to the outside. On the other hand, a reception signal received at the ground conductor 4 is sent to the wireless IC 22 via the loop-shaped conductor 24.

As previously described, the ground conductor 4 defines and functions as a radiating element (antenna element) in the RFID system 20, in which an electric current flows as indicated by arrows a in FIG. 2. The communication frequency band of the RFID system 20 preferably is 900 MHz band (mainly about 865 MHz to about 920 MHz). The communication frequency band of the cellular (GSM) system 30 preferably is also 900 MHz band (mainly about 824 MHz to about 960 MHz). Both systems use signals of generally equal frequency bands. In the cellular system 30, a transmission signal is transmitted at a stronger electric power than that of a reception signal of the RFID system 20. Therefore, when a transmission signal from the main antenna 35 is input to the RFID device 21, the wireless IC 22 is driven and, accordingly, the output from the main antenna 35 decreases.

In view of such a configuration, in the present preferred embodiment of the present invention, the RFID device 21 includes a feeder circuit (matching circuit) 43 which is configured such that the resonant frequency is within the aforementioned communication frequency band if a reception signal of the RFID system 20 is input, and the resonant frequency is out of the aforementioned communication frequency band if a transmission signal of the cellular system 30 is input.

The RFID device 21 which provides the above-described functions and effects will now be fundamentally described. In the RFID device 21, as shown in the form of an equivalent circuit in FIG. 3, the feeder circuit 43 preferably includes a resonance circuit 41 on the wireless IC side and a matching circuit 44 which is coupled to a resonance circuit 42 on the antenna side, and the matching circuit 44 preferably includes a transformer circuit portion T and an additional circuit portion A. The resonance circuit 41 on the wireless IC side preferably includes a capacitor C, an inductor L and a resistor R, which are provided inside the wireless IC 22. The resonance circuit 42 on the antenna side mainly preferably includes an inductance component L of the loop-shaped conductor 24.

In the RFID device 21, a resonant frequency which is mainly determined by the resonance circuit 42 on the antenna side and a resonant frequency which is mainly determined by the resonance circuit 41 on the wireless IC side are set to a frequency in the vicinity of the used frequency of the RFID system 20. The resonant frequency of the resonance circuit 41 on the wireless IC side is configured mainly using the inductance component of the transformer circuit portion T and the capacitance component of the wireless IC 22 so as to resonate at a frequency in the vicinity of the used frequency when an electric power which is near the minimum driving power of the wireless IC 22 is input from the antenna side.

The present inventor discovered that the impedance of the wireless IC 22 varies depending on the strength of the input electric power. This is because the wireless IC 22 which is preferably defined by a semiconductor integrated circuit element uses a booster circuit which has a nonlinear characteristic depending on the strength of the input electric power. Specifically, the internal capacitance of the wireless IC 22 (the capacitance value of the capacitor C) varies. This variation of the internal capacitance is deliberately utilized for the variation of the communication frequency of the RFID system 20, so that the resonant frequency of the resonance circuit 41 of the RFID system 20 is varied depending on the strength of the electric power input to the wireless IC 22.

Figure 4:
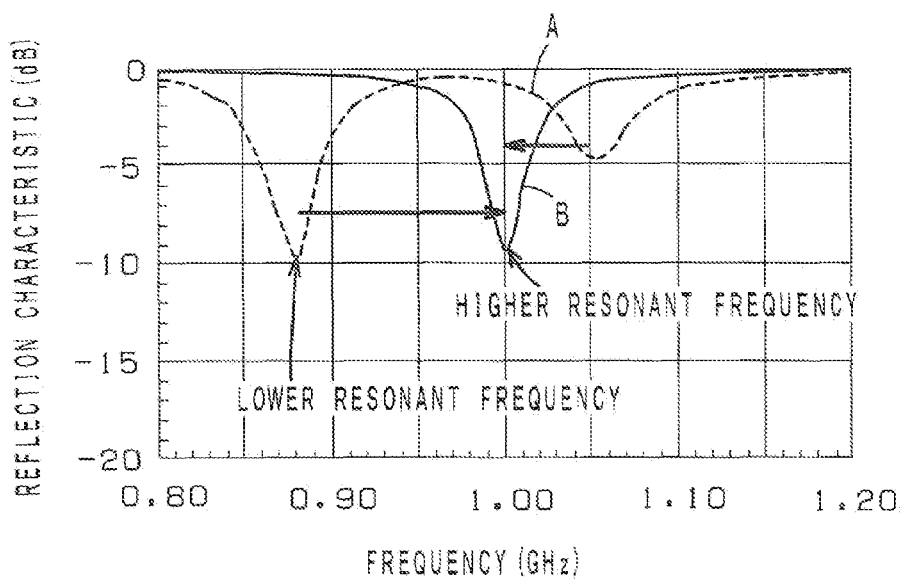
FIG. 4 is a graph illustrating the reflection characteristic seen from the antenna side in the RFID system.

When the wireless IC 22 receives a predetermined signal (when an RFID signal is input to the wireless IC 22), the feeder circuit 43 operates at a predetermined resonant frequency (see the characteristic represented by broken line A in FIG. 4). On the other hand, when an electric power which is near the minimum driving power of the wireless IC 22 is input from the antenna side, the wireless IC 22 resonates at a frequency in the vicinity of the used frequency. As a result, when a signal leaking out from the main antenna 35 of the cellular system 30 is received (when a cellular signal is input), the resonant frequency on the wireless IC 22 side shifts in a direction away from the vicinity of the used frequency (the degeneracy is broken). As a result, the resonant frequency on the antenna side also shifts due to that effect and, accordingly, the resonant frequency of the feeder circuit 43 shifts to the outside of the aforementioned communication frequency band (see the characteristic represented by solid line B in FIG. 4).

That is, when a strong electric power is added to the wireless IC 22, the capacitance component of the wireless IC 22 increases and, accordingly, the resonant frequency on the high frequency side decreases. Also, when the capacitance component of the wireless IC 22 increases, it operates such that the input electric power is confined in the resonance circuit on the high frequency side, and therefore, the amount of the electric current flowing to the primary side coil decreases, so that the coupling coefficient of the transformer coupling decreases. That is, the mutual inductance of the primary side coil portion decreases and, accordingly, the total inductance decreases. As a result, the mutual inductance of the secondary side coil portion also decreases and, accordingly, the total inductance decreases. Therefore, the resonance circuit on the low frequency side shifts to the high frequency side. That is, two resonant frequencies generated by the transformer coupling shift from a state of degeneracy broken by strong magnetic coupling to a state in which the degeneracy by weak coupling has been broken (it operates such that the two resonant frequencies become closer to each other) so that they look like a single resonant frequency. With this, also as for the resonant frequency on the antenna side, the wireless IC 22 hardly operates when a signal is output from the main antenna 35, and deterioration of the characteristics of a transmission signal of the GSM is prevented.

Furthermore, using the transformer circuit portion T in the feeder circuit 43 provides the following advantages. By making the resonant frequency on the antenna side and the resonant frequency on the wireless IC side closer to each other, a broader frequency bandwidth is achieved. That is, the variation of the resonant frequencies which occurs due to environmental variations is tolerable. Also, variations in manufacturing of the feeder circuit 43 are tolerable. In addition, even when a transmission wave of another communication system is input to the RFID device 21 at a large electric power and the wireless IC 22 is driven such that spurious radiation is output, radiation of that component to the outside is significantly reduced by the transformer circuit portion T. That is, significant reduction of the output of spurious radiation leads to reduction of the effects on peripheral circuits. Furthermore, the feeder circuit 43 is a band-pass filter circuit, so that spurious radiation is further reduced.

Note that, at the used frequency of the RFID system 20, a signal is weak between the wireless IC 22 and a reader/writer (not shown). Therefore, communication can be established without affecting the cellular system 30.

In the first example of the feeder circuit 43 in the RFID system 20, as shown in the equivalent circuit of FIG. 5, inductors L1, L2 and capacitors C1, C2 are coupled in series between input/output terminals T1, T2 of the wireless IC 22 (including the resonance circuit 41) and antenna terminals T11, T12, respectively. An inductor L3 is coupled between the input/output terminals T1, T2, and a capacitor C3, an inductor L4, and a capacitor C4 are coupled in series between the antenna terminals T11, T12. The inductors L1, L2, L3 define the transformer circuit portion T (autotransformer).

Figure 3:
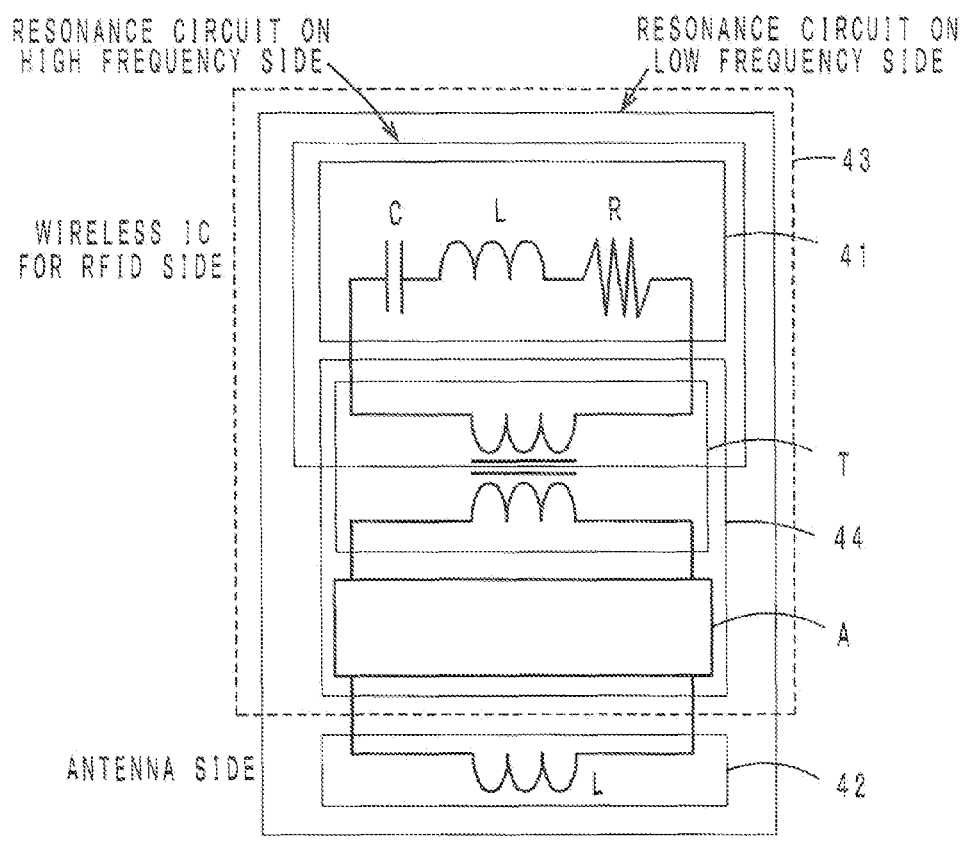
FIG. 3 is a fundamental equivalent circuit diagram of an RFID system incorporated in the wireless communication apparatus.

The feeder circuit 43 shown in FIG. 5 has an autotransformer configuration rather than a transformer configuration such as shown in FIG. 3. This is because a large coupling coefficient is obtained with a small inductance component. The capacitors C1 to C4 and the inductor L4 define the additional circuit portion A (harmonic removing filter). This is for the purpose of cutting out harmonic components leaking out from the wireless IC 22 by the filter.

Due to this feeder circuit 43, radiation (spurious radiation) of harmonics which are generated by input of a strong electric power of the GSM system 30, for example, to the RFID system 20 via the loop-shaped conductor 24 is reduced. Furthermore, the RFID system 20 has a broader frequency bandwidth as previously described.

Figure 16:
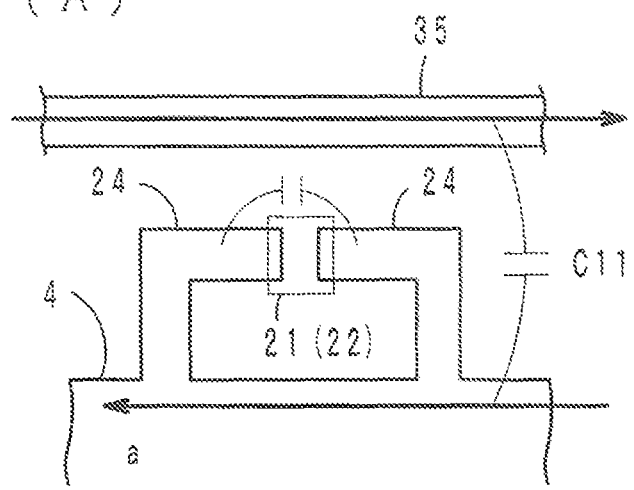
FIG. 16 shows illustration diagrams of electric currents flowing through the RFID system and an antenna of the cellular system.
Figure 16:
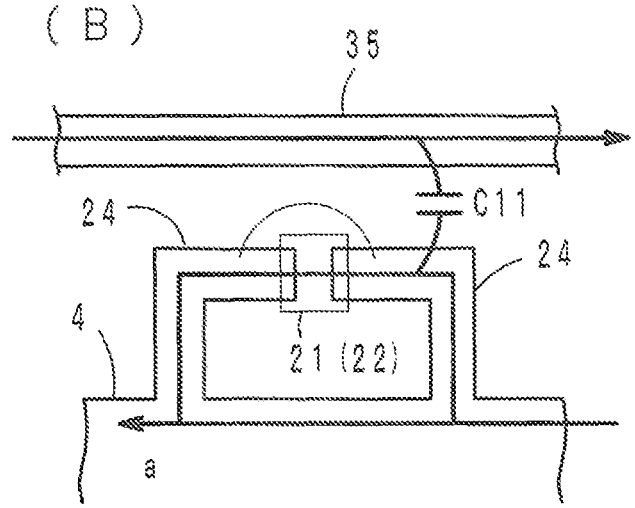

As shown in (B) of FIG. 16, when the end portions of the loop-shaped conductor 24 are in an electrically conductive state established by the RFID device 21 (wireless IC 22), stray capacitance C11 occurs between the main antenna 35 and the loop-shaped conductor 24. A reception signal of the cellular system is very weak, and when the reception signal is consumed by the loop-shaped conductor 24 which is coupled by the stray capacitance C11, the reception sensitivity at the main antenna 35 deteriorates. In the feeder circuit 43 that is the first example, a case current a flowing through the loop-shaped conductor 24 is blocked by the capacitors C1 to C4, and therefore, the stray capacitance C11 that occurs between the main antenna 35 and the loop-shaped conductor 24 decreases. (A) of FIG. 16 shows a state that the case current a does not flow into the loop-shaped conductor 24. That is, in the feeder circuit 43 that is the first example, the case current a flowing through the loop-shaped conductor 24 is blocked by the capacitors, and therefore, the reception signal of the cellular system would not flow through the loop-shaped conductor 24, and the distance between the reception signal flowing through the main antenna 35 and the case current a flowing through the ground conductor 4 increases. Accordingly, the stray capacitance between the main antenna 35 and the ground conductor 4 decreases, and mutual cancellation of magnetic fields which occurs between the main antenna 35 and the ground conductor 4 also decreases. Therefore, deterioration of the reception sensitivity of the main antenna 35 is prevented.

Figure 6:
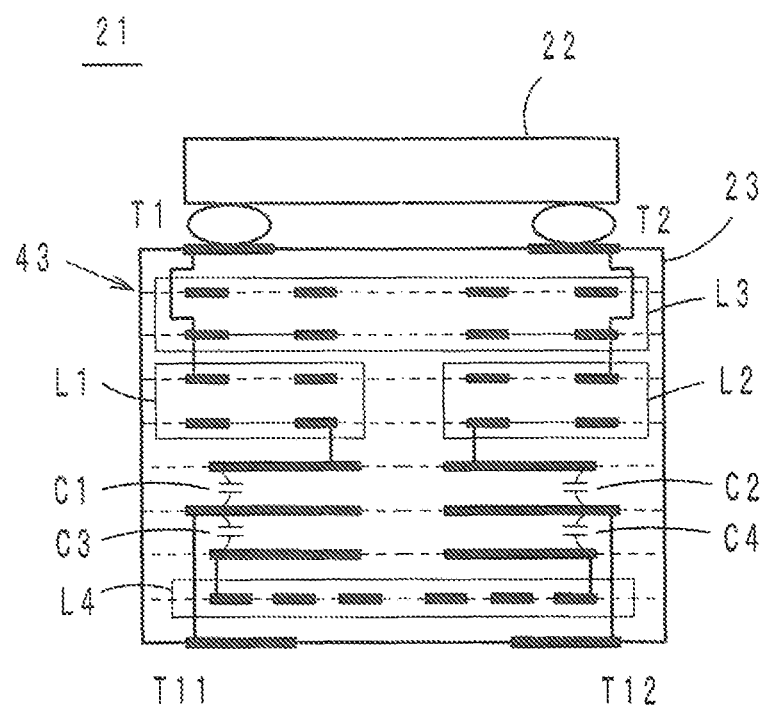
FIG. 6 is a schematic cross-sectional view showing a feeder circuit board in the first example.
Figure 7:
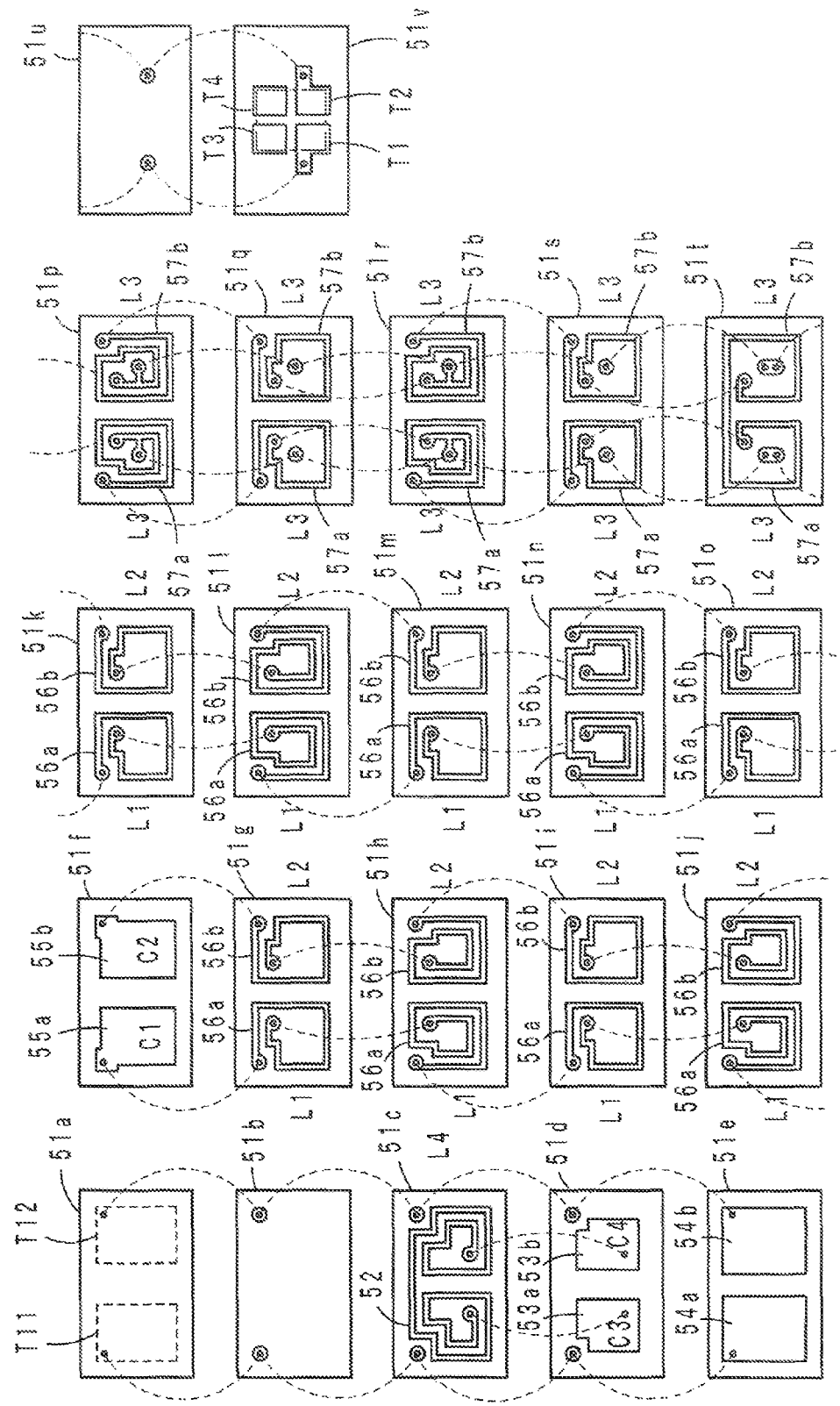
FIG. 7 is an exploded plan view separately showing layers of the disassembled feeder circuit board.

The feeder circuit 43 preferably is incorporated in the feeder circuit board 23 that is structured as a multilayer substrate as shown in FIG. 6. Respective layers of the feeder circuit board 23 are as shown in FIG. 7. That is, sheets 51a to 51v (the sheet 51a is the lowermost layer and the sheet 51v is the uppermost layer) on which various electrodes have been provided are sequentially stacked up, bonded by compression, and baked when necessary, such that the feeder circuit board 23 is obtained. The respective sheets 51a to 51v are made of a dielectric material or the like. The various electrodes preferably are formed by screen printing, for example, using a conductor paste.

Specifically, as shown in FIG. 7, the sheet 51a includes the antenna terminals T11, T12 on the rear surface and via-hole conductors. The sheet 51b includes via-hole conductors. The sheet 51c includes a coil conductor 52 on the front surface and via-hole conductors. The sheets 51d, 51e, 51f include capacitance electrodes 53a, 53b, 54a, 54b, 55a, 55b on the front surfaces and via-hole conductors. The sheets 51*h* to 51*t* include coil conductors 56*a*, 56*b*, 57*a*, 57*b* on the front surfaces and via-hole conductors. The sheet 51*u* includes via-hole conductors. The sheet 51*v* includes input/output terminals T1, T2, which are to be coupled to the wireless IC 22, and mounting terminals T3, T4 on the front surface, and via-hole conductors.

The above-described sheets 51*a* to 51*v* are stacked up, such that the via-hole conductors are coupled together as represented by broken lines in FIG. 7. In this case, the coil conductor 52 defines the inductor L4. The capacitance electrodes 53*a*, 54*a* define the capacitor C3, and the capacitance electrodes 53*b*, 54*b* define the capacitor C4. The capacitance electrodes 54*a*, 55*a* define the capacitor C1, and the capacitance electrodes 54*b*, 55*b* define the capacitor C2. Further, the coil conductor 56*a* defines the inductor L1, the coil conductor 56*b* defines the inductor L2, and the coil conductors 57*a*, 57*b* define the inductor L3.

Figure 8:
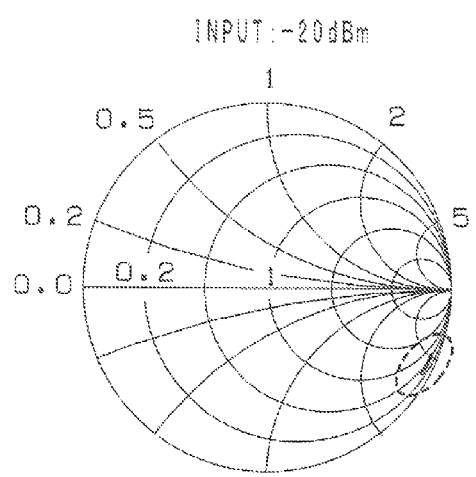
FIG. 8 shows Smith chart diagrams of the impedance characteristics of the first example.
Figure 8:
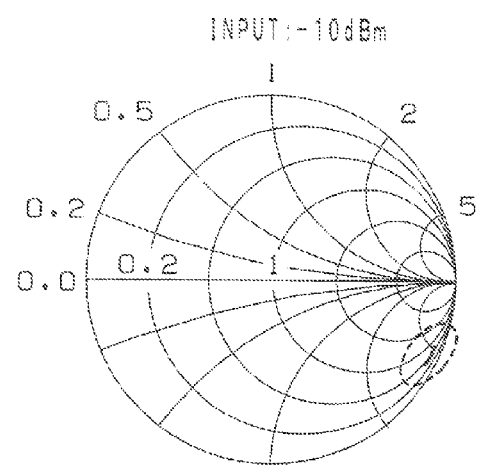
Figure 8:
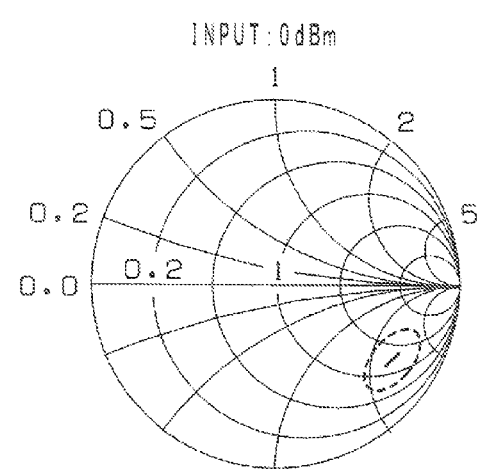
Figure 8:
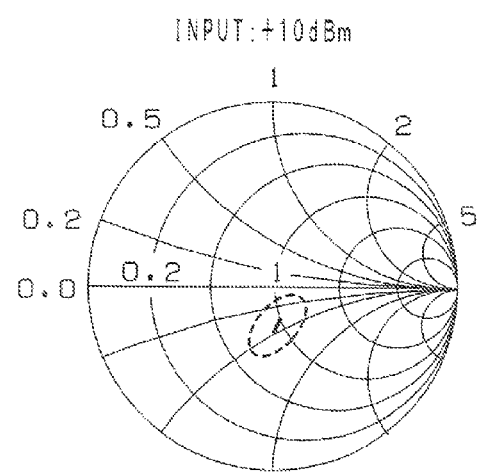

In the feeder circuit 43 that is the first example, the impedance at a time of input of an electric power (frequency: about 0.5 GHz to about 1.0 GHz, for example) to the wireless IC 22 is shown in FIG. 8. (A) of Fig. shows the impedance at a time of input of about −20 dBm. (B) of FIG. 8 shows the impedance at a time of input of about −10 dBm. (C) of FIG. 8 shows the impedance at a time of input of about 0 dBm. (D) of FIG. 8 shows the impedance at a time of input of about +10 dBm. The impedance region is represented by a bold line in each diagram. As seen from these Smith charts, the impedance varies as the electric power increases. Preferred embodiments of the present invention were conceived based on the variation of the impedance of the wireless IC 22 which occurs in accordance with such a variation of the input power.

Specifically, since the RFID system uses a power near about −10 dBm, the impedance slightly varies when a power which is greater than about −10 dBm is input but, however, the input power increases, and therefore, the shift of the impedance is canceled. However, if the input power becomes excessively large, it will reach an uncancelable level. On the other hand, a transmission signal of the GSM system is about +33 dBm, and therefore, the variation of the impedance is large.

Figure 9:
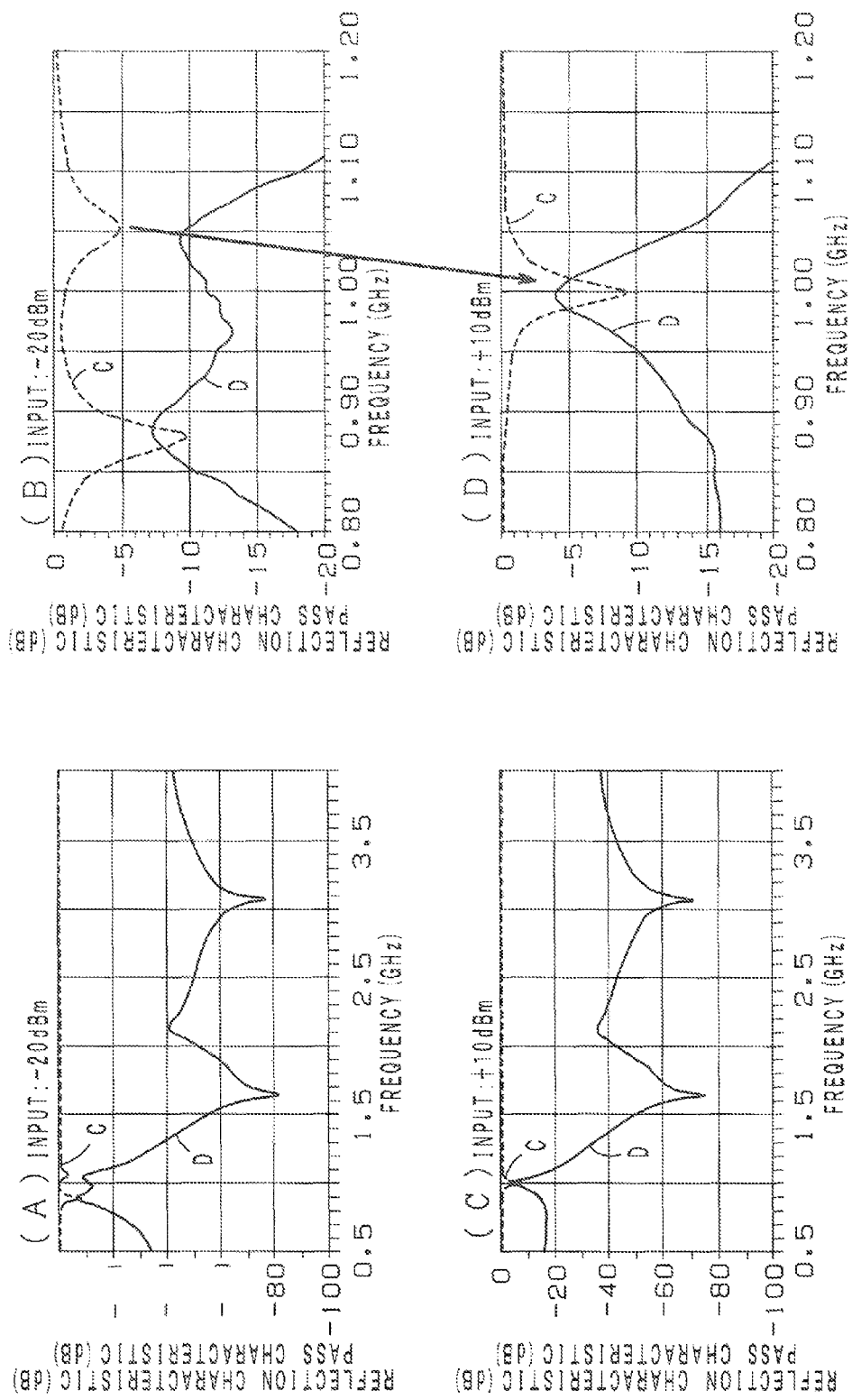
FIG. 9 shows graphs of the reflection characteristics and the pass characteristics which are seen from the antenna side in the first example.

FIG. 9 shows the reflection characteristics (see broken lines C) and the pass characteristics (see solid lines D) which are seen from the antenna side in the first example of the feeder circuit 43. (A) of FIG. 9 shows the waveform of the impedance over the frequencies of about 0.5 GHz to about 4.0 GHz when the input power is about −20 dBm (minimum driving power). (B) of FIG. 9 shows an enlarged waveform of a portion of the waveform of (A) of FIG. 9 corresponding to the frequencies of about 0.8 GHz to about 1.2 GHz. (C) of FIG. 9 shows the waveform of the impedance over the frequencies of about 0.5 GHz to about 4.0 GHz when the input power is about +10 dBm (when receiving the transmission power of the GSM system). (D) of FIG. 9 shows an enlarged waveform of a portion of the waveform of (C) of FIG. 9 corresponding to the frequencies of about 0.8 GHz to about 1.2 GHz.

As clearly seen from the comparison of (B) of FIG. 9 and (D) of FIG. 9, when the electric power increases from about −20 dBm to about +10 dBm, the resonant frequency shifts from about 1.05 GHz to about 1.00 GHz. Note that the used frequency band of the RFID system preferably is about 915 MHz to about 928 MHz in Japan, about 902 MHz to about 928 MHz in the United States of America, and about 865 MHz to about 868 MHz in Europe, for example. As for the used frequency bands of the GSM system, in the case of E-GSM, the output signal preferably is about 880 MHz to about 915 MHz, and the input signal preferably is about 925 MHz to about 960 MHz.

Figure 10:
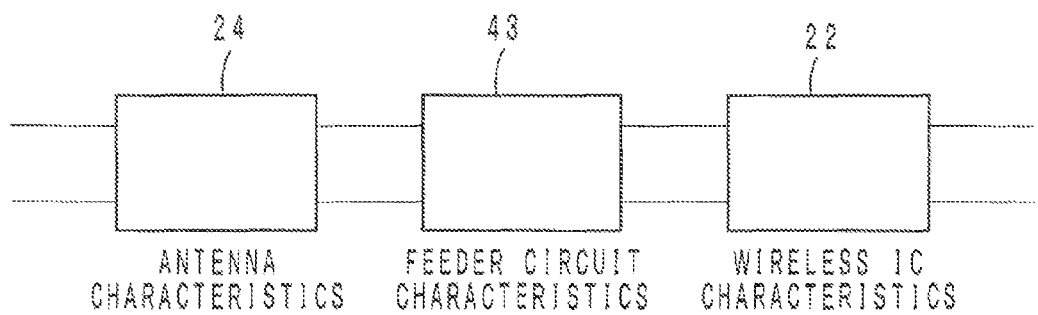
FIG. 10 is a circuit diagram based on which the characteristics of FIG. 9 were simulated.

The reflection characteristics and the pass characteristics shown in FIG. 9 are values calculated by a circuit simulator after the characteristics of the antenna formed by the loop-shaped conductor 24, the characteristics of the feeder circuit 43, and the characteristics of the wireless IC 22 were measured, as shown in FIG. 10.

Figure 11:
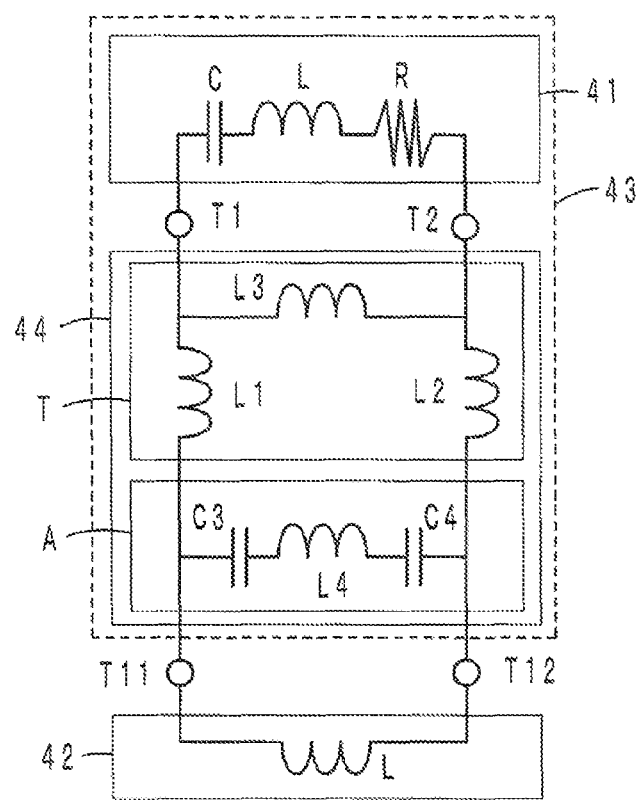
FIG. 11 is an equivalent circuit diagram showing the second example of the feeder circuit in the RFID system.
Figure 12:
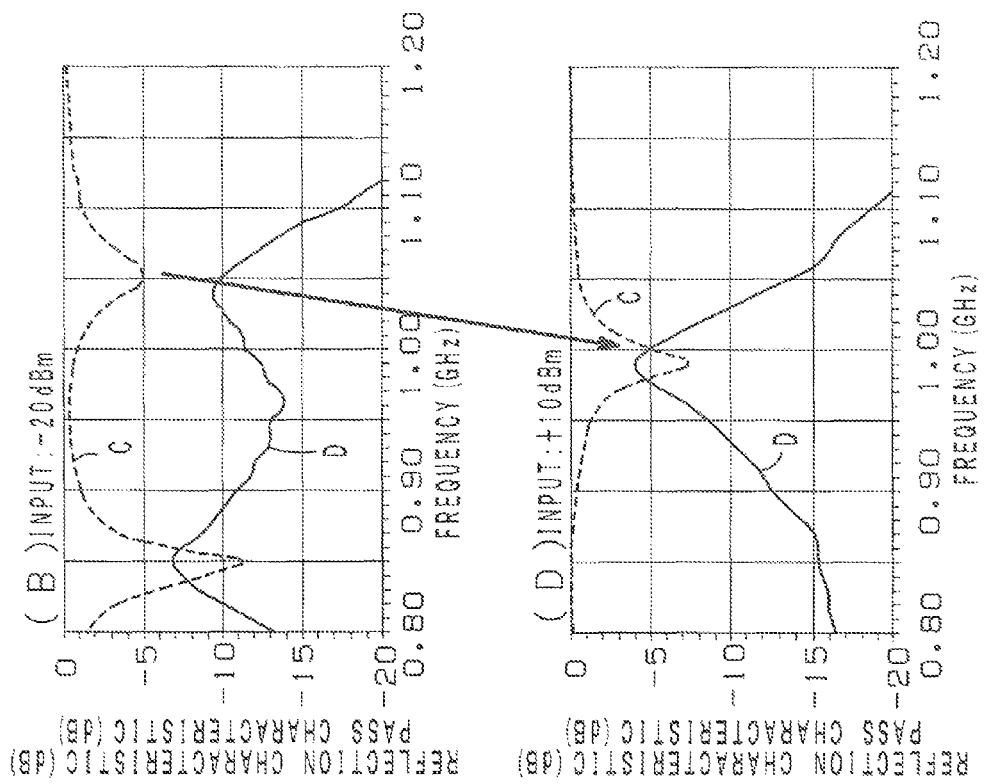
FIG. 12 shows graphs of the reflection characteristics and the pass characteristics which are seen from the antenna side in the second example.
Figure 12:
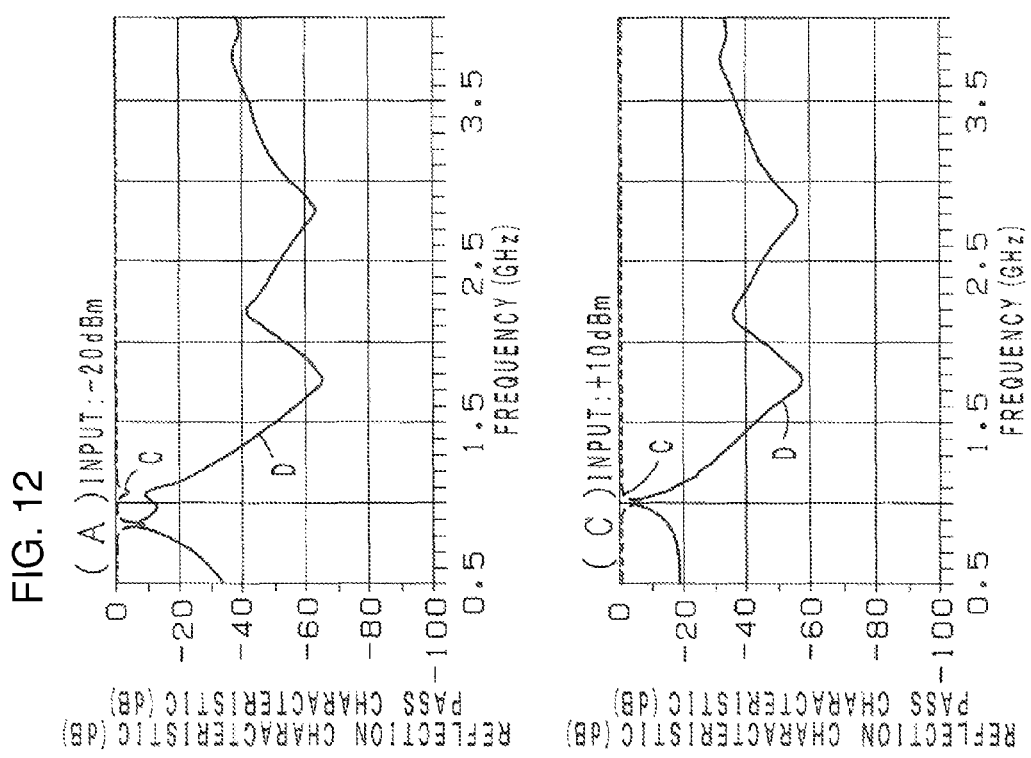

The second example of the feeder circuit 43 is obtained by omitting the capacitors C1, C2 from the above-described first example (see FIG. 5) as shown in the equivalent circuit of FIG. 11, while the other elements are preferably the same as those of the first example, and the inductors L1, L2, L3 define an autotransformer. The reflection characteristics and the pass characteristics which are seen from the antenna side in the second example are shown in FIG. 12. FIG. 12 was obtained in the same way as FIG. 10 which has previously been described. The functions and effects obtained in the second example are basically the same as those of the above-described first example.

Figure 13:
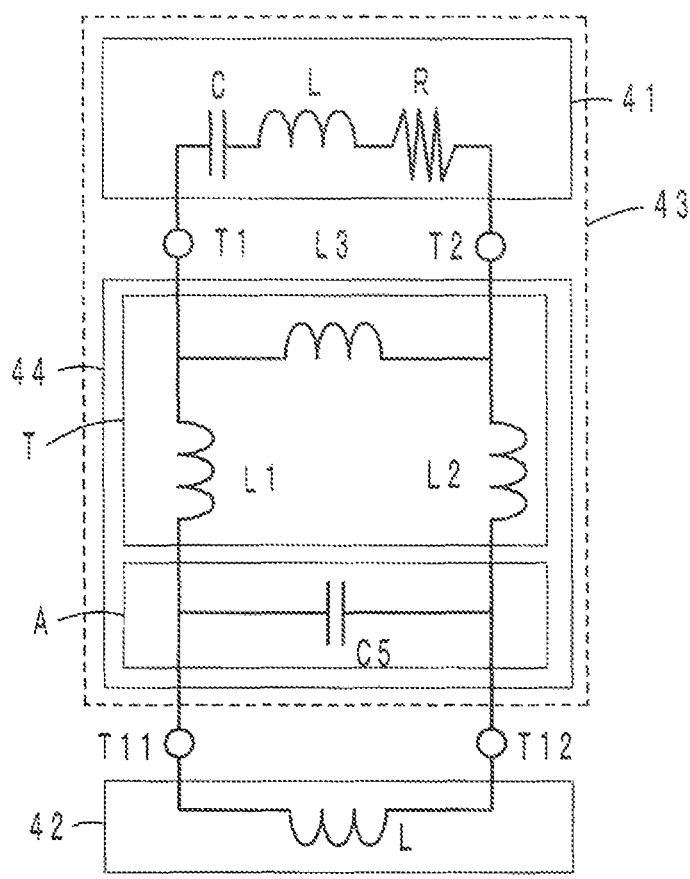
FIG. 13 is an equivalent circuit diagram showing the third example of the feeder circuit in the RFID system.

The third example of the feeder circuit 43 is obtained by providing a capacitor C5 coupled between the antenna terminals T11, T12 in the above-described second example as shown in the equivalent circuit of FIG. 13, while the other elements are preferably the same as those of the second example, and the inductors L1, L2, L3 define an autotransformer. The functions and effects obtained in the third example are basically the same as those of the above-described second example.

Figure 14:
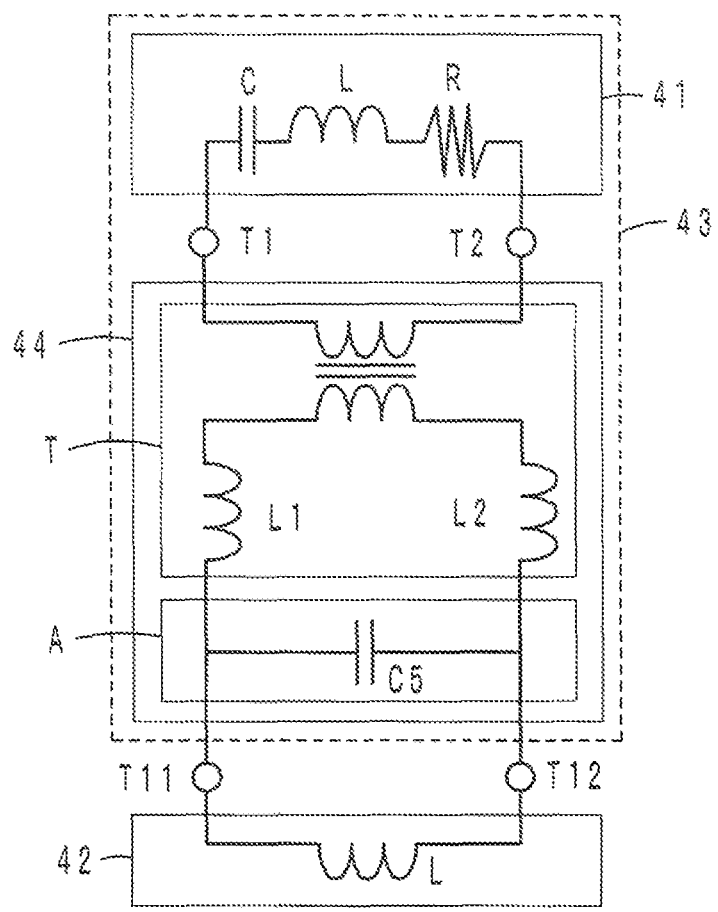
FIG. 14 is an equivalent circuit diagram showing the fourth example of the feeder circuit in the RFID system.

The fourth example of the feeder circuit 43 is configured as shown in the equivalent circuit of FIG. 14 such that inductors L1, L2 are coupled between the transformer circuit portion T and the antenna terminals T11, T12, respectively, and a capacitor C5 is coupled between the antenna terminals T11, T12. The functions and effects obtained in the fourth example are basically the same as those of the above-described first example.

Figure 15:
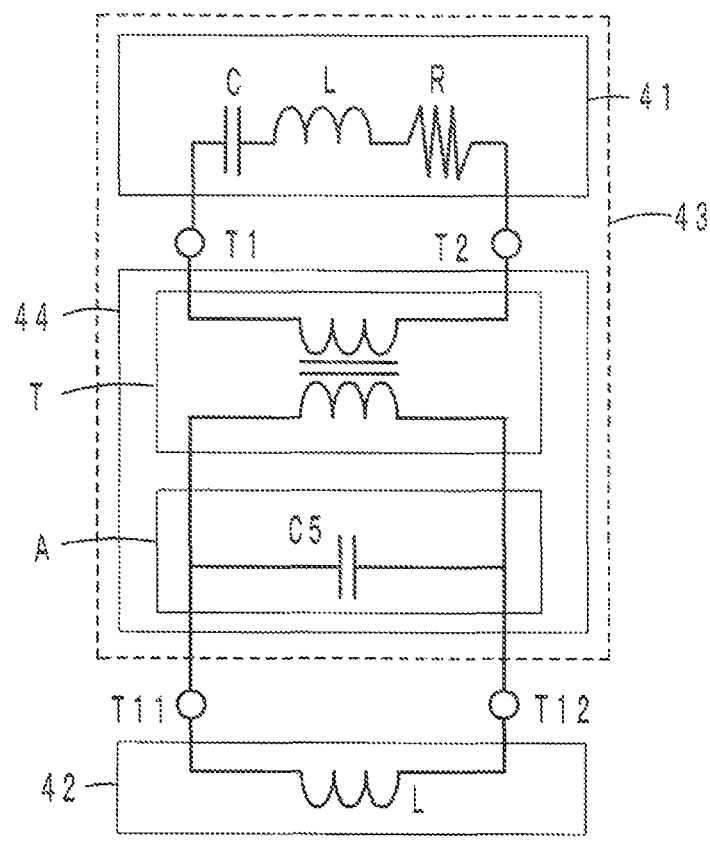
FIG. 15 is an equivalent circuit diagram showing the fifth example of the feeder circuit in the RFID system.

The fifth example of the feeder circuit 43 is obtained by omitting the inductors L1, L2 from the above-described fourth example as shown in the equivalent circuit of FIG. 15, while the other elements are preferably the same as those of the fourth example. The functions and effects obtained in the fifth example are basically the same as those of the fourth example.

A wireless communication apparatus and an antenna device according to the present invention are not limited to the above-described examples but can be variously modified within the scope of the spirit of the present invention.

For example, the configuration of the resonance circuit and the configuration of the transformer circuit portion are arbitrary. Also, the multilayer structure of the feeder circuit board can be selected from various forms.

As described above, various preferred embodiments of the present invention are useful for a wireless communication apparatus and an antenna device and are particularly advantageous in that adverse effects of one of communication systems on transmission signals of the other communication system are significantly reduced, minimized or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication apparatus comprising:
   a first communication system; and
   a second communication system configured to transmit a transmission signal in a communication frequency band which is the same or substantially the same as that of the first communication system and at an electric power which is stronger than that of a reception signal of the first communication system; wherein
   the first communication system includes a feeder circuit having a resonant frequency, the resonant frequency being within the communication frequency band if a reception signal of the first communication system is input, and the resonant frequency being out of the communication frequency band if a transmission signal of the second communication system is input.

2. The wireless communication apparatus according to claim 1, wherein a wireless IC of the first communication system is configured such that an impedance at a time of input of a reception signal of the first communication system and an impedance at a time of input of a transmission signal of the second communication system are different.

3. The wireless communication apparatus according to claim 2, wherein the wireless IC is a semiconductor integrated circuit element configured to process UHF-band RFID signals.

4. The wireless communication apparatus according to claim 1, further comprising a common ground conductor defining a radiation electrode and configured to be used by the first communication system and the second communication system.

5. The wireless communication apparatus according to claim 1, wherein the first communication system is an RFID system, and the second communication system is a cellular system.

6. The wireless communication apparatus according to claim 1, wherein the wireless communication apparatus is a cell phone.

7. An antenna device for use in a first communication system of a wireless communication apparatus that includes the first communication system and a second communication system configured to transmit a transmission signal in a communication frequency band which is the same or substantially the same as that of the first communication system and at an electric power which is stronger than that of a reception signal of the first communication system, wherein the antenna device comprises:
   a feeder circuit having a resonant frequency, the resonant frequency being within the communication frequency band if a reception signal of the first communication system is input, and the resonant frequency being out of the communication frequency band if a transmission signal of the second communication system is input.

8. The antenna device according to claim 7, wherein the feeder circuit includes a transformer circuit portion.

9. The antenna device according to claim 8, wherein
   an antenna is coupled to a primary side of the transformer circuit portion to define an antenna side resonance circuit;
   a wireless IC is coupled to a secondary side of the transformer circuit portion to define an IC side resonance circuit;
   both a resonant frequency which is achieved by the antenna side resonance circuit and a resonant frequency which is achieved by the IC side resonance circuit are within or in a vicinity of the communication frequency band; and
   the resonant frequency which is achieved by the IC side resonance circuit is substantially determined by an inductance component of the transformer circuit portion and an impedance component of the wireless IC.

10. The antenna device according to claim 9, wherein when a reception signal of the second communication system is input, the antenna device does not resonate in a frequency band of the reception signal.

11. The antenna device according to claim 9, wherein the wireless IC is coupled to the antenna via a capacitance.

12. The antenna device according to claim 8, wherein the transformer circuit portion includes a plurality of inductors.

13. The antenna device according to claim 8, wherein the transformer circuit portion has an autotransformer configuration.

14. The antenna device according to claim 8, further comprising a feeder circuit board defined by a multilayer substrate and including the feeder circuit therein.

15. The antenna device according to claim 14, wherein the multilayer substrate includes antenna terminals, inductors and a capacitor, and the inductors are coupled between the transformer circuit portion and the antenna terminals, respectively, and the capacitor is coupled between the antenna terminals.

16. The antenna device according to claim 7, wherein the feeder circuit is configured to perform a band pass filter function which allows passage of a reception signal of the first communication system and which blocks a harmonic of the reception signal.

17. The antenna device according to claim 9, further comprising a matching circuit coupled to the antenna side resonance circuit and including the transformer circuit portion and an additional circuit portion.

18. The antenna device according to claim 17, wherein the additional circuit portion includes a plurality of capacitors and an inductor configured to define a harmonic removing filter.

19. The antenna device according to claim 9, wherein the IC side resonance circuit includes a capacitor, an inductor and a resistor provided inside the wireless IC.

20. The antenna device according to claim 9, wherein the antenna side resonance circuit includes an inductance component of a loop-shaped inductor.

* * * * *